(No Model.)

J. W. ROBERTSON.
SEED PLANTER.

No. 252,802. Patented Jan. 24, 1882.

WITNESSES:
Thos Houghton
John C Kenon

INVENTOR:
James W. Robertson
BY
ATTORNEYS.

UNITED STATES PATENT OFFICE.

JAMES W. ROBERTSON, OF HARDIN, ASSIGNOR OF ONE-HALF TO GEORGE ALEXANDER MARSHALL, OF SIDNEY, OHIO.

SEED-PLANTER.

SPECIFICATION forming part of Letters Patent No. 252,802, dated January 24, 1882.

Application filed June 23, 1881. (No model.)

*To all whom it may concern:*

Be it known that I, JAMES WALLACE ROBERTSON, of Hardin, in the county of Shelby and State of Ohio, have invented a new and useful Improvement in Seed-Planters, of which the following is a full, clear, and exact description, reference being had to the accompanying drawings, forming part of this specification.

My invention relates to seed-planters in which the seeds are dropped in hills by means of a rotating axle having feed-wheels rigidly secured thereon; and it has for its object to provide an adjustable marking or check-rowing device, whereby the planter shall be adapted for planting seeds in rows of greater or less distance apart.

The invention consists in certain peculiarities of construction, as hereinafter set forth in the claim.

Figure 1:
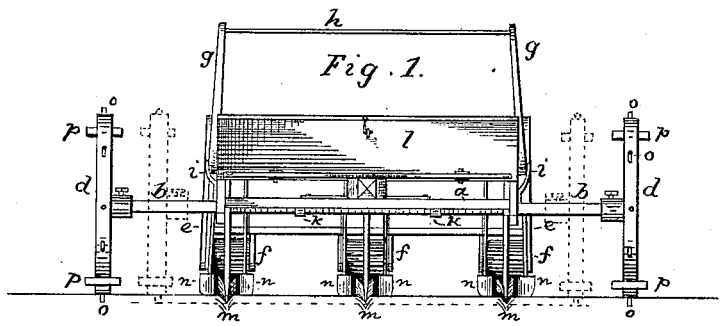
Figure 2:
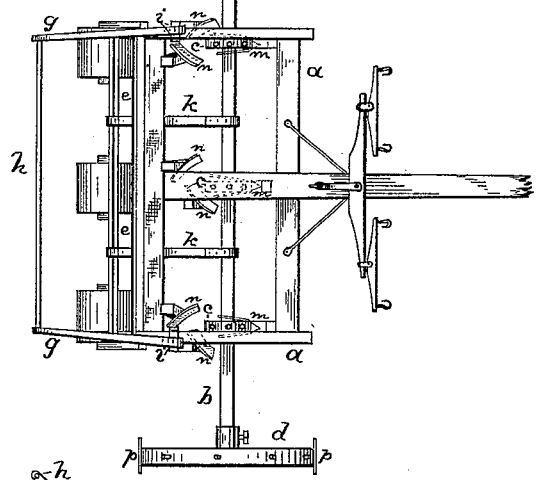
Figure 3:
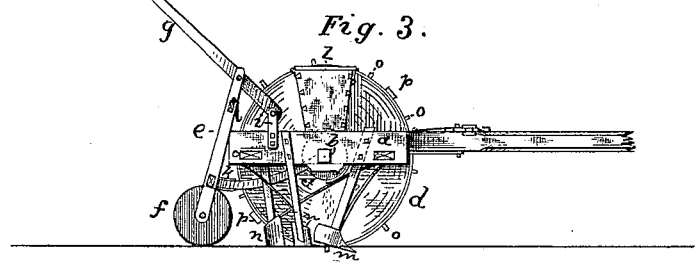

In the accompanying drawings, Figure 1 is a front elevation; Fig. 2, a plan view with the seed-box removed, and Fig. 3 a side elevation with one of the drive-wheels removed.

The horizontal frame $a$ is provided on its under side with bearings, in which are secured the journals of the rotating axle $b$. Upon this axle are rigidly secured three small feed-wheels, $c$, at suitable intervals apart, and the two driving-wheels $d$ are secured upon the same axle in such manner that they shall be longitudinally adjustable thereon. A vertical frame, $e$, carrying three rollers, $f$, is provided at the top with two oscillating levers, $g$, whose outer or rear ends are connected by a cross-bar or handle, $h$, and whose inner ends are pivoted in brackets $i$, which are secured to the upper surface of the main frame. The lower bar of the vertical frame $e$ is connected with the axle $b$ by means of curved bars $k$, which are provided with suitable joints at their ends to allow of sufficient oscillation.

By means of a hook on the upper portion of the vertical frame and a staple at the rear of the horizontal frame the vertical frame may be locked in such a position as to elevate the horizontal frame and driving-wheels above their normal plane, in which position they are held by depressing the handle $h$, and thus balancing the planter upon the rollers $f$.

The feed-wheels $c$ are made, in the usual manner, with cups in their peripheries for receiving the grain as they are made to rotate through suitable openings in the bottom of the seed-box $l$, and they are provided with curved guards for retaining the seeds in the cups until each cup shall come directly beneath the axle, when it is allowed to deposit its contents in the furrow.

In front of each feed-wheel is an opener, $m$, consisting of a steel point or tongue having rearward-extending wings or guards for holding the furrow open until the seeds shall have been dropped therein. Each opener is followed by two coverers, $n$, which are obliquely inclined toward each other, and one of which is located slightly in advance of the other in order to facilitate the passage of the soil between them.

The driving-wheels $d$ are provided with pins $o$ around their circumferences to prevent sliding, and at two opposite points on their circumferences are markers $p$, which are so arranged with respect to the feed-wheels that they shall indicate points in line with the planted hills.

The check-rowing is accomplished in the following manner: When corn is to be planted the openers and coverers for the central feed-wheel may be removed and only the two outer sets put into use, in order to allow sufficient space between the rows of corn. The drive-wheels will then be secured upon the axle at its ends, which will allow them to project laterally beyond the planted rows just one-half the distance that intervenes between the two rows. Then, after the planter has been driven across the field, if, in returning, one of the wheels is made to retrace the outer track previously made, the rows will all be made at a uniform distance apart, and the markers, if made to remark their previous indentations in said track, will serve as a guide for check-rowing.

Any irregularity may be corrected by elevating the drive-wheels above ground, as before described, and rotating them with the hand until they are in the proper position.

In planting corn all of the cups in the feed-wheels are to be plugged, except two in each wheel, which should be opposite to each other and in line with the markers.

For planting beans, &c., the three sets of openers and feed-wheels will be used. In this case the adjustable drive-wheels will be moved inward along the axle and secured in position so that they shall be distant from the adjacent openers just one-half the distance that intervenes between two rows, as in the former case, and for the same purpose.

I am aware that seed-planters having a supplementary frame provided with wheels and adapted to support the main or forward frame above ground have before been used, and I therefore do not broadly claim such a planter.

Having thus described my invention, what I claim as new, and desire to secure by Letters Patent, is—

The combination, in a check-row planter, of the main frame $a$ and the supplementary frame $e$, hinged directly to the axle of the main frame by curved bars $k$, and having a number of rollers adapted to support the main frame above the ground, substantially as shown and described.

JAMES WALLACE ROBERTSON.

Witnesses:
A. L. MARSHALL,
JOHN W. D. WYMAN.